United States Patent [19]

Pinna

[11] Patent Number: 4,899,611
[45] Date of Patent: Feb. 13, 1990

[54] DEVICE FOR THE CORRECT POSITIONING OF THE LOWER STEERING SHAFT ON THE STEERING-BOX PINION AND ON THE UPPER SHAFT

[75] Inventor: Piero Pinna, Turin, Italy
[73] Assignee: Fiat Auto S.p.A., Turin, Italy
[21] Appl. No.: 195,564
[22] Filed: May 18, 1988
[30] Foreign Application Priority Data
   May 19, 1987 [IT]  Italy ............................. 67432 A/87
[51] Int. Cl.⁴ ............................................. B62D 1/16
[52] U.S. Cl. ........................................ 74/492; 180/79;
                                      403/14; 403/359; 464/135
[58] Field of Search ............... 180/79, 146, 147, 148,
          180/149, 79.3; 74/422, 498, 492; 403/13, 14,
                          359; 280/91; 464/134, 135

[56] References Cited

U.S. PATENT DOCUMENTS

| | | | |
|---|---|---|---|
| 4,180,939 | 1/1980 | Lange | 464/135 |
| 4,402,626 | 9/1983 | Recker | 403/359 |
| 4,628,758 | 12/1986 | Yuzuriha | 403/14 |

FOREIGN PATENT DOCUMENTS

| | | | |
|---|---|---|---|
| 635972 | 2/1962 | Canada | 403/359 |
| 201779 | 12/1982 | Japan | 180/79 |

Primary Examiner—Charles A. Marmor
Assistant Examiner—Brian L. Johnson
Attorney, Agent, or Firm—Sughrue, Mion, Zinn, Macpeak & Seas

[57] ABSTRACT

A device for the correct positioning of the lower steering shaft on the steering-box pinion and on the upper steering shaft respectively comprises a bush with a reference tooth which, as well as ensuring the correct positioning of the clamping screw, also simultaneously ensures the secure clamping of the screw for the correct connection of the aforementioned members. The reference tooth on the bush may be replaced by a bracket welded to the fork of the universal joint of the lower steering shaft.

1 Claim, 2 Drawing Sheets

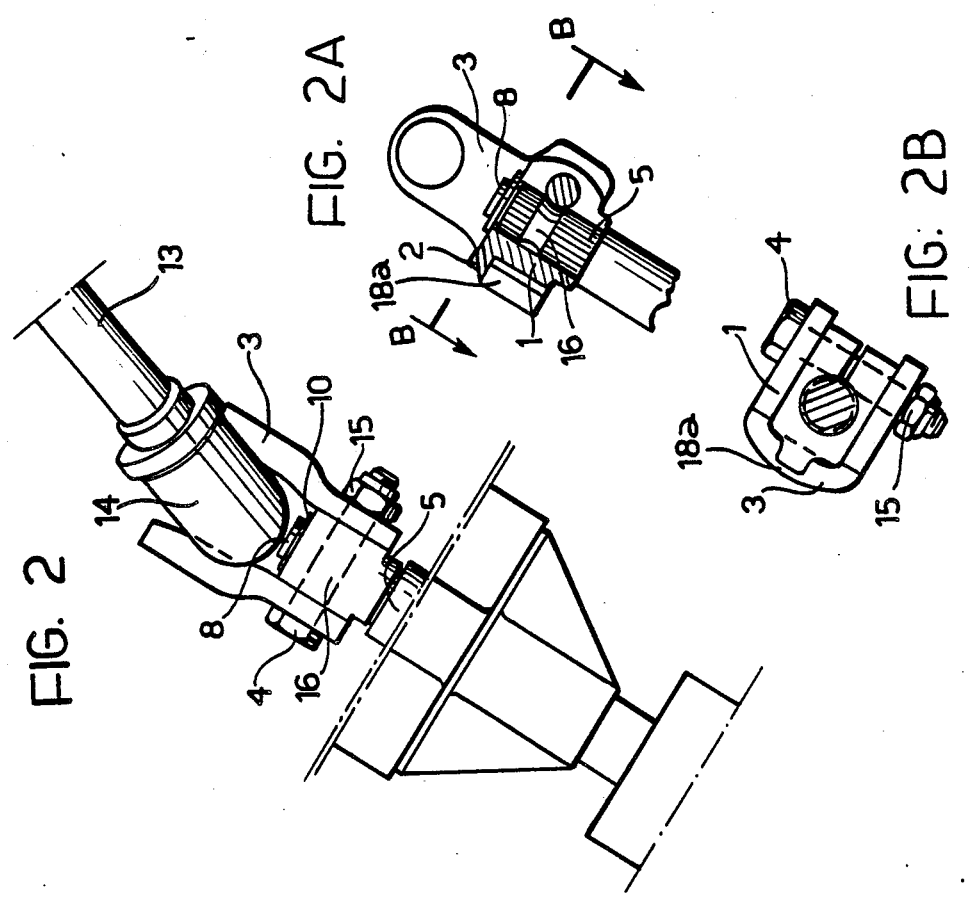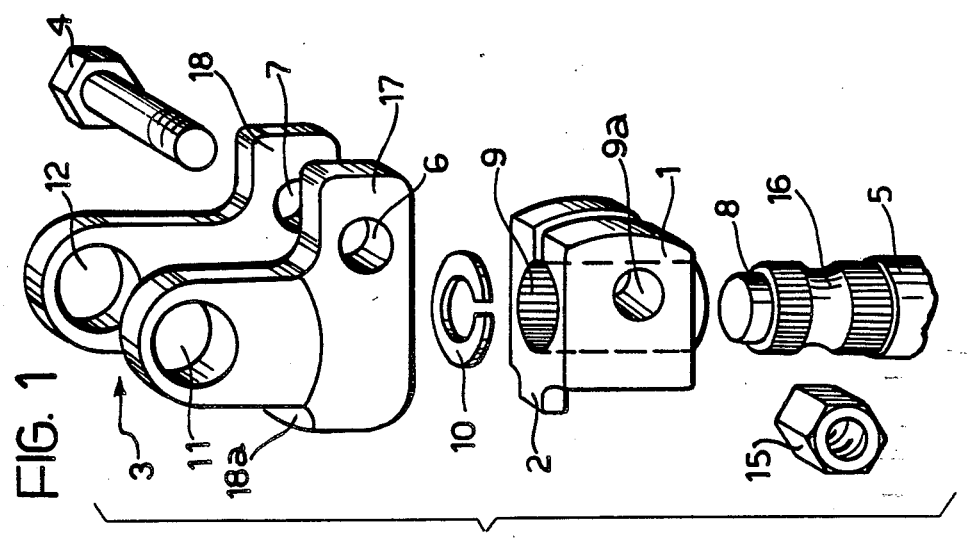

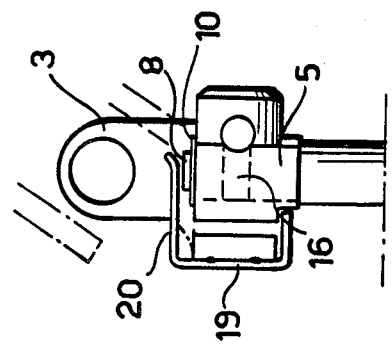
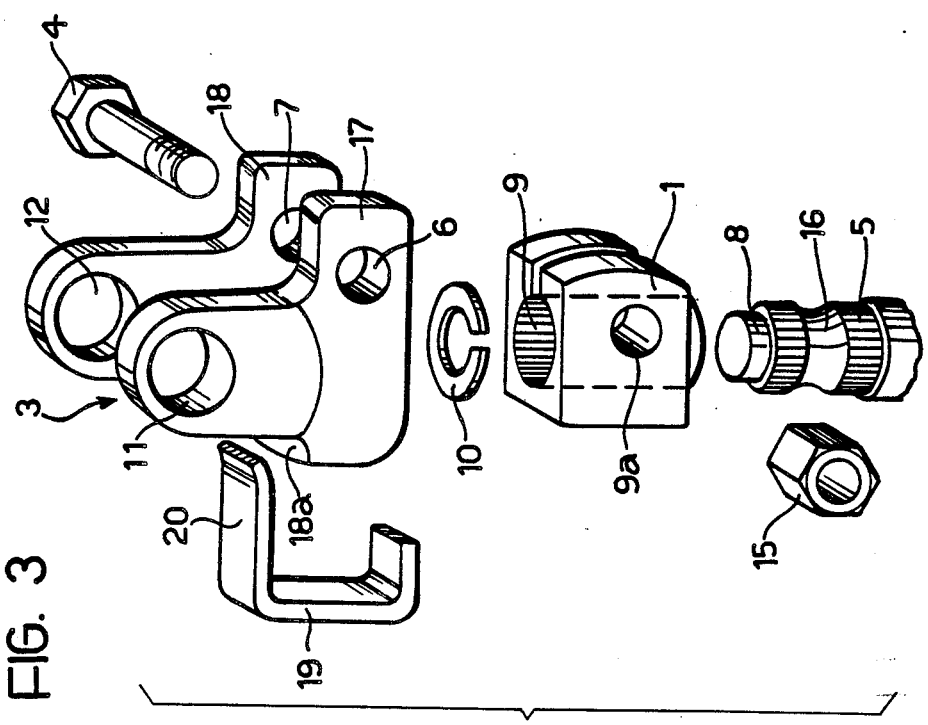

DEVICE FOR THE CORRECT POSITIONING OF THE LOWER STEERING SHAFT ON THE STEERING-BOX PINION AND ON THE UPPER SHAFT

The subject of the present invention is a device for the correct positioning of the lower steering shaft on the steering-box pinion and on the upper shaft, including a bush provided with a reference tooth for the correct positioning and/or connection of these members.

It is known that the connection of the aforementioned members is normally achieved by the tightening of a screw which connects the universal-joint fork of the lower steering shaft to the steering-box pinion and to the upper shaft.

This operation is not very reliable with a view to the safety of the vehicle since, during the positioning and/or connecting operations described above, the person carrying out the mounting cannot easily see to check reliably whether the clamping screw is engaged exactly in the groove of the steering-box pinion and of the upper shaft.

It is also known that the problems described above have been overcome by Italian patent application No. 54187B/86 of the same Applicant. The solution described in that document relates to a safety ring for the correct connection of the lower steering shaft to the steering-box pinion and to the upper shaft which, although ensuring on the one hand the perfect positioning of the screw, on the other hand limits the operator's movements in positioning the member.

SUMMARY OF THE INVENTION

The object of the present invention is to produce a device for the correct positioning of the lower steering shaft on the steering-box pinion and on the upper shaft, characterised in that it comprises a bush with a suitably-shaped reference tooth and a splined hole by means of which the bush is mounted on a cylindrical shank of the steering pinion, which, as well as ensuring on the one hand the correct positioning of the clamping screw, on the other hand ensures the secure tightening of the screw for the connection of the lower steering shaft to the steering box on the one hand and to the upper shaft on the other.

The invention also simplifies the mounting of the aforementioned members if an open-ended fork is used, the simplicity of mounting being due to the fact that the operator no longer has to carry out the operation of sliding the steering shaft upwards to insert the steering-box pinion.

The object described above is achieved by means of a bush for correct connection, having a suitably-shaped reference tooth which is able to determine the exact position of the universal-joint fork and enables the clamping screw to pass freely through through-holes formed in the fork and the bush. These and other objects will become clear from the description which follows with reference to the appended drawings.

BRIEF DESCRIPTION OF THE DRAWINGS

FIG. 1 is an exploded view of the detail which is the subject of the present invention, in a first embodiment, that is, with a reference tooth;

FIG. 2 shows a side view of the device with the parts shown in FIG. 1 assembled;

FIG. 2A is a partial sectional view of the device shown in FIG. 2;

FIG. 2B is a sectional view taken along the line B-B in FIG. 2A;

FIG. 3 is an exploded view of the detail which is the subject of the present invention, in a second embodiment, that is, with a reference bracket welded to the fork; and FIG. 4 is a section of the detail of FIG. 3.

DETAILED DESCRIPTION OF THE INVENTION

With reference to FIGS. 1 and 2, a fork, indicated at 3, has holes 11 and 12 formed in its upper part, into which the lower steering shaft 13 is inserted; holes into which a clamping screw 4 is fitted to connect the fork 3 of the universal joint 14 of the lower steering shaft 13 to the steering-box pinion 5 and to the upper shaft, not shown, are indicated at 6 and 7; a nut is indicated 15 and serves for the tightening for the screw 4; a bush, indicated 1, is mounted on a cylindrical shank 8 of the steering pinion 5 by means of a splined hole 9 and is held by a Seeger ring 10 without a groove; a hole formed in the bush 1 is indicated 9a and a groove which enables the passage of the clamping screw 4 is indicated 16; a suitably-shaped reference tooth on the bush 1 is indicated 2 and is arranged to determine the exact position of the fork 3 and thus enable the free passage of the clamping screw 4 through the groove 16 formed in the pinion 5; arms are indicated 17 and 18; a back of the fork 3, against which the reference tooth 2 of the bush 1 abuts to determine the exact position of the clamping screw 4 in the holes 6 and 7 and in the groove 16 of the pinion 5, is indicated 18a.

With reference to FIGS. 3 and 4, the parts described in detail in FIGS. 1 and 2 are indicated by the same reference numerals, while 4, as a possible variant of the solution described, a C-shaped bracket welded to the fork 3 is indicated 19 and is constituted by an upper part 20 which determines the end of travel of the pinion 5 when it is fitted into the fork 3, thus determining the correct positioning of the screw 4 and the secure clamping of the universal-joint fork 3 of the lower steering shaft 13 to the steering-box pinion 5 and to the upper shaft, as described above.

In order to mount the device which is the subject of the present invention correctly, the operator must proceed in the following manner:

(a) with respect to the first solution described, that is, the bush 1 with a reference tooth 2, the steering box pinion 5, on which the bush 1 is already mounted, is inserted into the fork 3; the clamping screw 4 is then fitted in the holes 6 and 7 and tightened with the nut 15. The clamping of the screw 4 is ensured by the perfect positioning of the reference tooth 2 formed on the bush 1 which is positioned on the back 18a of the fork 3. If the operator does not push the pinion 5, on which the bush 1 is keyed, right to the end, the reference tooth 2 is not positioned on the back 18a of the fork 3 and the holes 6 and 7 are thus not aligned and the anomaly is therefore immediately identified.

(b) with respect to the second solution described above, however, the operator must proceed in the following manner: the steering box pinion 5, on which the bush 1 is already mounted, is inserted until the cylindrical shank 8 meets the upper part 20 of the bracket 19; the screw 4 is then fitted into the holes 6 and 7 and tightened with the nut 15.

Naturally, the scope of the present invention extends to models which achieve equal utility by means of the same innovative concept.

I claim:

1. A vehicle steering system comprising:
   a steering pinion having a splined, cylindrical shank with a circumferential groove,
   a split bush having a splined axial hole in which said splined shank of said pinion is engaged and a pair of aligned transverse holes disposed in tangential alignment with said groove,
   a steering shaft,
   a universal joint connected to said steering shaft and including a fork into which said bush and said shank of said pinion are fitted, said fork having a pair of aligned holes disposed in alignment with said aligned holes in said bush, a clamping screw engaged in said groove in said shank and extending through said holes in said fork and said bush to connect and clamp said universal joint to said shank, and
   reference means comprising a C-shaped bracket welded to said fork and having an upper part arranged to abut said shank of said pinion to determine an exact position wherein said holes in said fork and said bush are aligned for the passage of said clamping screw upon fitting said bush on said shank into said fork.

* * * * *